US010890600B2

(12) United States Patent
Li et al.

(10) Patent No.: US 10,890,600 B2
(45) Date of Patent: Jan. 12, 2021

(54) REAL-TIME VISUAL-INERTIAL MOTION TRACKING FAULT DETECTION

(71) Applicant: GOOGLE LLC, Mountain View, CA (US)

(72) Inventors: Mingyang Li, Mountain View, CA (US); Joel Hesch, Mountain View, CA (US); Zachary Moratto, Mountain View, CA (US)

(73) Assignee: Google LLC, Mountain View, CA (US)

( * ) Notice: Subject to any disclaimer, the term of this patent is extended or adjusted under 35 U.S.C. 154(b) by 554 days.

(21) Appl. No.: 15/596,016

(22) Filed: May 16, 2017

(65) Prior Publication Data

US 2017/0336439 A1 Nov. 23, 2017

Related U.S. Application Data

(60) Provisional application No. 62/337,987, filed on May 18, 2016.

(51) Int. Cl.
*G01P 21/00* (2006.01)
*G06F 3/038* (2013.01)
*G01S 5/02* (2010.01)
*G01C 19/00* (2013.01)
*G06T 7/73* (2017.01)
(Continued)

(52) U.S. Cl.
CPC .............. *G01P 21/00* (2013.01); *G01C 19/00* (2013.01); *G01S 5/0294* (2013.01); *G06F 3/038* (2013.01); *G06F 3/011* (2013.01); *G06F 17/18* (2013.01); *G06T 7/74* (2017.01)

(58) Field of Classification Search
CPC . G01P 21/00; G01C 19/00; G06T 7/74; G06F 3/011; G06F 17/18
See application file for complete search history.

(56) References Cited

U.S. PATENT DOCUMENTS 6,474,159 B1   11/2002   Foxlin et al.
7,015,831 B2    3/2006   Karlsson et al.
(Continued)

FOREIGN PATENT DOCUMENTS

CN   102541256 A   7/2012
CN   104811683 A   7/2015
(Continued)

OTHER PUBLICATIONS

Li, Mingyang et al. "Real-time Motion Tracking on a Cellphone using Inertial Sensing and a Rolling-Shutter Camera", IEEE International Conference on Robotics and Automation, May 6-10, 2013.*
(Continued)

*Primary Examiner* — Manuel L Barbee

(57) ABSTRACT

Fault detection for real-time visual-inertial odometry motion tracking. A fault detection system allows immediate detection of error when the motion of a device cannot be accurately determined. The system includes subdetectors that operate independently and in parallel to a main system on a device to determine if a condition exists which results in a main system error. Each subdetector covers a phase of a six-degrees of freedom (6DOF) estimation. If any of the subdetectors detect an error, a fault is output to the main system to indicate a motion tracking failure.

20 Claims, 8 Drawing Sheets

(51) Int. Cl.
G06F 3/01 (2006.01)
G06F 17/18 (2006.01)

(56) References Cited

U.S. PATENT DOCUMENTS

| | | | |
|---|---|---|---|
| 7,395,181 | B2 | 7/2008 | Foxlin |
| 9,197,891 | B1* | 11/2015 | Namboodiri ..... H04N 19/00684 |
| 9,552,648 | B1* | 1/2017 | Zhang ..................... G06T 7/246 |
| 10,073,531 | B2 | 9/2018 | Hesch et al. |
| 2007/0076267 | A1 | 4/2007 | Pierce et al. |
| 2008/0012935 | A1 | 1/2008 | Echtenkamp |
| 2012/0194644 | A1 | 8/2012 | Newcombe et al. |
| 2013/0332064 | A1 | 12/2013 | Funk et al. |
| 2014/0119598 | A1 | 5/2014 | Ramachandran et al. |
| 2014/0281779 | A1* | 9/2014 | Wellman ............. G06F 11/0706 714/746 |
| 2014/0379256 | A1 | 12/2014 | Stipes et al. |
| 2015/0071524 | A1 | 3/2015 | Lee |
| 2015/0098614 | A1 | 4/2015 | Gee et al. |
| 2015/0193949 | A1 | 7/2015 | Katz et al. |
| 2015/0285636 | A1 | 10/2015 | Funk et al. |
| 2015/0285638 | A1 | 10/2015 | Funk et al. |
| 2015/0366527 | A1* | 12/2015 | Yu .......................... A61B 5/055 382/131 |
| 2016/0086385 | A1 | 3/2016 | Gourlay et al. |
| 2016/0307328 | A1 | 10/2016 | Moeglein et al. |
| 2016/0364124 | A1* | 12/2016 | Heater ................ G06F 3/04845 |
| 2017/0039765 | A1 | 2/2017 | Zhou et al. |
| 2017/0046594 | A1 | 2/2017 | Nerurkar et al. |
| 2017/0053538 | A1 | 2/2017 | Samarasekera et al. |
| 2018/0075643 | A1 | 3/2018 | Sequeira et al. |
| 2018/0089904 | A1 | 3/2018 | Jurgensen et al. |
| 2018/0143756 | A1 | 5/2018 | Mildrew et al. |

FOREIGN PATENT DOCUMENTS

| | | |
|---|---|---|
| CN | 105424026 A | 3/2016 |
| WO | 2015164696 A1 | 10/2015 |

OTHER PUBLICATIONS

Sirtkaya, S., et al., "Loosely Coupled Kalman Filtering for Fusion of Visual Odometry and Internal Navigation", 16th International Conference on Information Fusion, Jul. 9, 2013, 8 pages.
Hesch, J.A., & Bowman, S.L., "Consistency Analysis and Improvement Vision-aided Inertial Navigation", IEEE, Sep. 20, 2013, 19 pages.
International Preliminary Report on Patentability dated Nov. 29, 2019 for PCT Application No. PCT/US2017/033299, 11 pages.
International Preliminary Report on Patentability dated Nov. 29, 2018 for PCT Application No. PCT/US2017/033321, 8 pages.
Non-Final Office Action dated Jan. 22, 2019 for U.S. Appl. No. 15/595,617, 15 pages.
U.S. Appl. No. 15/595,617, filed May 15, 2017, listing Esha Nerurkar et al., as inventors, entitled "System and Method for Concurrent Odometry and Mapping".
U.S. Appl. No. 15/597,366, filed May 17, 2017, listing Esha Nerurkar et al., as inventors, entitled "System and Method for Fault Detection and Recovery for Concurrent Odometry and Mapping".
Joel A. Hesch et al., "Consistency Analysis and Improvement of Vision-Aided Inertial Navigation", IEEE Transactions on Robotics, vol. 30, No. 1, Feb. 2013, 19 pages.
Salim Sirtkaya et al., "Loosely Coupled Kalman Filtering for Fusion of Visual Odometry and Inertial Navigation", Proceedings of the 16th International Conference on Information Fusion, Jul. 9-12, 2013, 8 pages.
Søren Riisgaard et al., "SLAM for Dummies: A Tutorial Approach to Simultaneous Localization and Mapping", Massachusetts Institute of Technology, 2004, 127 pages.
International Search Report and Written Opinion dated Nov. 16, 2017 for PCT/US17/033299, 28 pages.
Li Mingyan, et al., "Real-time motion tracking on a cellphone using inertial sensing and a rolling-shutter camera", IEEE International Conference on Robotics and Automation, May 6-10, 2013, 8 pages.
Examination Report dated Dec. 10, 2018 for EP Application No. 17730978.8, 6 pages.
Final Office Action dated Dec. 11, 2018 for U.S. Appl. No. 15/597,366, 24 pages.
International Search Report and Written Opinion correlating to PCT/US17/033321, dated Jul. 28, 2017, 13 pages.
Lloyd Hayden Hughes, "Enhancing Mobile Camera Pose Estimation Through the Inclusion of Sensors", Thesis (MSc)—Stellenbosch University, Dec. 1, 2014, 115 pages.
International Search Report and Written Opinion correlating to PCT/US17/033357, dated Aug. 1, 2017, 16 pages.
Written Opinion of the International Preliminary Examining Authority dated May 2, 2018 for PCT/US2017/033299, 11 pages.
International Preliminary Report on Patentability dated May 8, 2018 for PCT/US2017/033357, 16 pages.
Invitation to Restrict or Pay Additional Fees, and Where Applicable, Protest Fee dated Mar. 7, 2018 for PCT Application No. PCT/US2017/033299, 5 pages.
Written Opinion of the International Preliminary Examining Authority dated Apr. 30, 2018 for PCT Application No. PCT/US2017/033321, 5 pages.
Non-Final Office Action dated Jul. 5, 2018 for U.S. Appl. No. 15/597,366, 18 pages.
Final Office Action dated Jun. 13, 2019 for U.S. Appl. No. 15/595,617, 17 pages.
Restriction Requirement dated Oct. 25, 2018 for U.S. Appl. No. 15/595,617, 5 pages.
Non-Final Office Action dated May 1, 2019 for U.S. Appl. No. 15/597,366, 17 pages.
Final Office Action dated Aug. 30, 2018 for U.S. Appl. No. 15/597,366, 21 pages.
Notice of Allowance dated Jan. 31, 2020 for U.S. Appl. No. 15/595,617, 8 pages.
Final Office Action dated Jul. 8, 2020 for U.S. Appl. No. 15/597,366, 32 pages.
Non-Final Office Action dated Mar. 24, 2020 for U.S. Appl. No. 15/597,366, 31 pages.
Blas, et al., "Fault-Tolerant 3D Mapping with Application to an Orchard Robot", Proceedings of the 7th IFAC Symposium on Fault Detection, Supervision and Safety of Technical Processes; Jul. 3, 2009; pp. 893-898.
Office Action dated Oct. 29, 2020 for Chinese Patent Application No. 201780013650.1, 18 pages.

* cited by examiner

REAL-TIME VISUAL-INERTIAL MOTION TRACKING FAULT DETECTION

CROSS-REFERENCE TO RELATED APPLICATIONS

The present application claims priority to U.S. Patent Application Ser. No. 62/337,987 (Attorney Docket No. 1500-G16013-PR), entitled "Methods And Systems For VR/AR Functionality In A Portable Device" and filed on 18 May 2016, the entirety of which is incorporated by reference herein for all purposes.

BACKGROUND

Field of the Disclosure

The present disclosure relates generally to motion tracking and a system for detecting and recovering from faults during motion tracking.

Description of the Related Art

Motion tracking allows a device to understand its motion with respect to position and orientation as it moves through an area. Motion tracking is useful in virtual reality applications such as gaming which allows a user to explore a virtual world from a fixed viewpoint. The tracked motion can be characterized by how many degrees of freedom are possible in movement, for example, either three degrees of freedom (3DoF) or six degrees of freedom (6DoF). In virtual reality applications, tracking motion with respect to 6DoF can provide an improved user experience because the tracking captures rotational movement and translational movement in the X, Y, and Z directions.

A device may employ visual-inertial odometry to track motion. Visual-inertial odometry enables the device to estimate, in real-time, its position and orientation, referred to as a pose. If a device is unable to identify its pose, the quality of the user experience is reduced.

BRIEF DESCRIPTION OF THE DRAWINGS

For a better understanding of the disclosure and the various embodiments described herein, reference is now made to the following brief description, taken in connection with the accompanying drawings and detailed description, which show at least one exemplary embodiment.

DETAILED DESCRIPTION

It should be understood at the outset that although an illustrative implementation of one or more embodiments are provided below, the description is not to be considered as limiting the scope of the embodiments described herein. The disclosure may be implemented using any number of technique, whether currently known or in existence. The disclosure should in no way be limited to the illustrative implementations, drawings, and techniques illustrated and described herein, which may be modified within the scope of the appended claims along with a full scope of equivalence.

The present disclosure provides a fault detection system to detect fault conditions when a visual-inertial odometry (VIO) estimator of an electronic device is unable to accurately estimate the motion of the device. The fault detection system includes a plurality of subdetectors that independently operate to detect different failure conditions in a motion tracking system. If any of these subdetectors detect a failure, a motion tracking failure message or fault is triggered by the fault detection system. A number of factors may trigger a fault. For example, in one embodiment, a fault may be caused by the electronic device moving such that the images it captures becomes blurred such as in cases where the electronic device may be shaken or tossed about rapidly. In another embodiment, a fault may be triggered by the inertial measurements from an accelerometer or gyroscope becoming saturated. Saturation is a state in which the signals that needs to be measured is larger than the dynamic range of the sensor. In some embodiments, a fault that is triggered by the subdetectors may result in a fault detection system reset.

Referring first to FIG. 1, illustrative embodiments of electronic devices in which the fault detection system may be implemented is shown. Electronic devices can include a portable user device, such as head mounted display (HMD), a tablet computer, computing-enabled cellular phone (e.g., a "smartphone"), a notebook computer, a personal digital assistant (PDA), a gaming console system, and the like. In other embodiments, the electronic device can include a fixture device, such as medical imaging equipment, a security imaging sensor system, an industrial robot control system, a drone control system, and the like. For ease of illustration, the electronic device 100 is generally described herein in the example context of an HMD system. However, the electronic device is not limited to these example implementations.

Figure 1A:
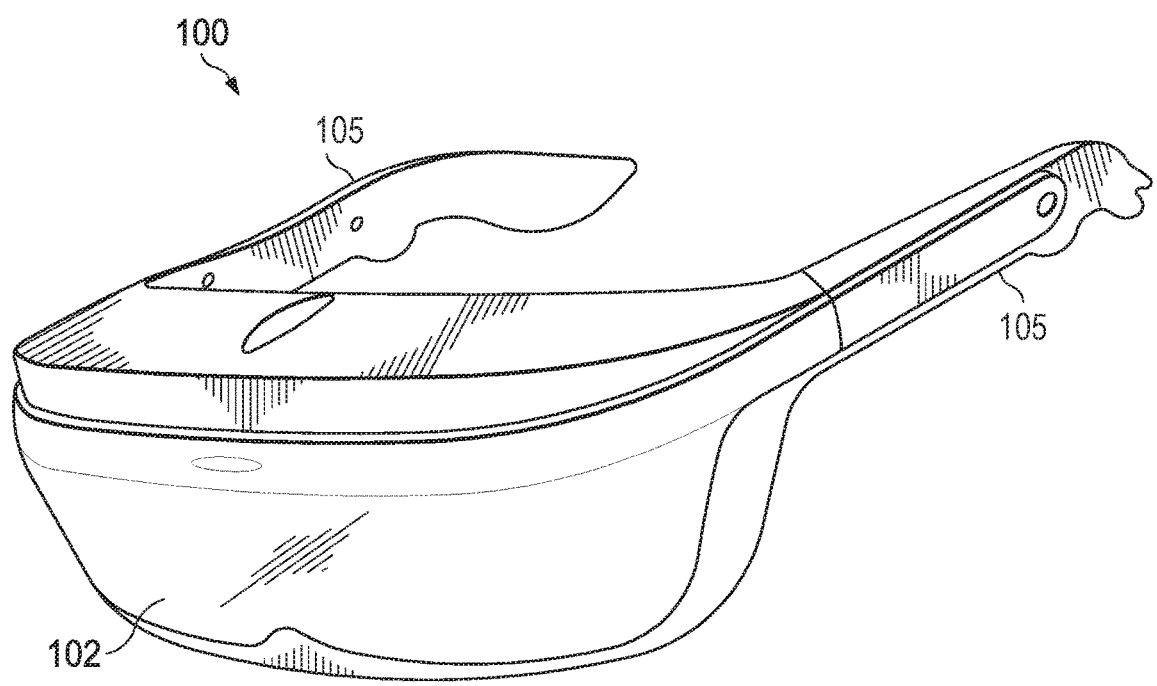
FIG. 1 consisting of FIG. 1A
FIG. 1B illustrates HMDs in accordance with an illustrative embodiment of the disclosure.

FIG. 1A illustrates an electronic device in a HMD 100 form factor in accordance with an illustrative embodiment of the disclosure. The HMD 100 may be implemented in other form factors, such as a smart phone form factor, tablet form factor and the like, which implement configurations analogous to those illustrated. HMD 100 has a housing 102 that is mounted on the head of a user by a set of straps 105 or harness. HMD 100 is meant to immerse the user in whatever image is being displayed on the device.

Figure 1B:
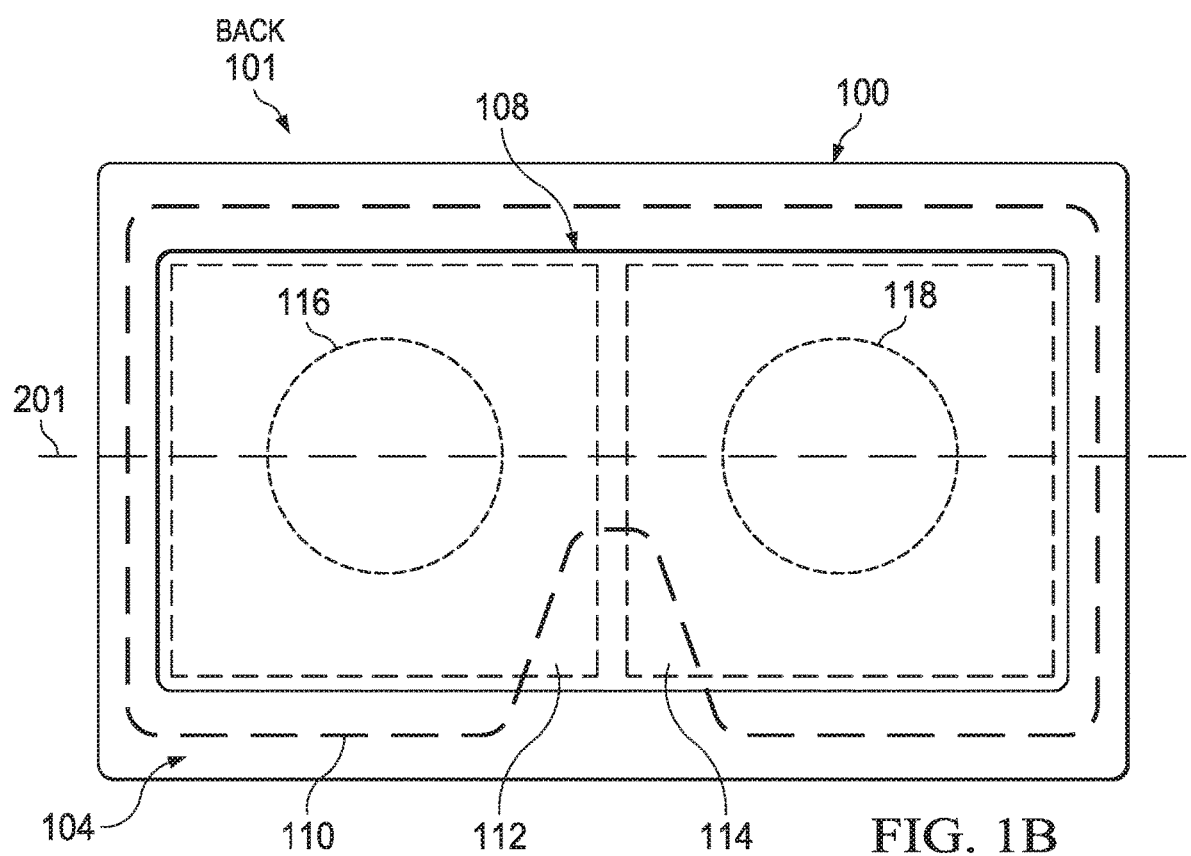

FIG. 1B illustrates a back plan view 101 of an illustrative embodiment of the electronic device 100 of FIG. 1A in accordance with at least one embodiment of the present disclosure. As illustrated by the back plan view 100 of FIG. 1B, the HMD 100 can include the display device 108 disposed at the surface 104, a face gasket 110 for securing the electronic device 100 to the face of a user (along with the use of straps or a harness), and eyepiece lenses 116 and 118, one each for the left and right eyes of the user 110. As depicted in the back plan view 101, the eyepiece lens 116 is aligned with a left-side region 112 of the display area of the display device 108, while the eyepiece lens 118 is aligned with a right-side region 114 of the display area of the display device 108. Thus, in a stereoscopic display mode, imagery captured by an imaging sensor (not shown) may be displayed in the left-side region 112 and viewed by the user's left eye via the eyepiece lens 116 and imagery captured by the imaging sensor may be displayed in the right-side region 114 and viewed by the user's right eye via the eyepiece lens 118.

Figure 2:
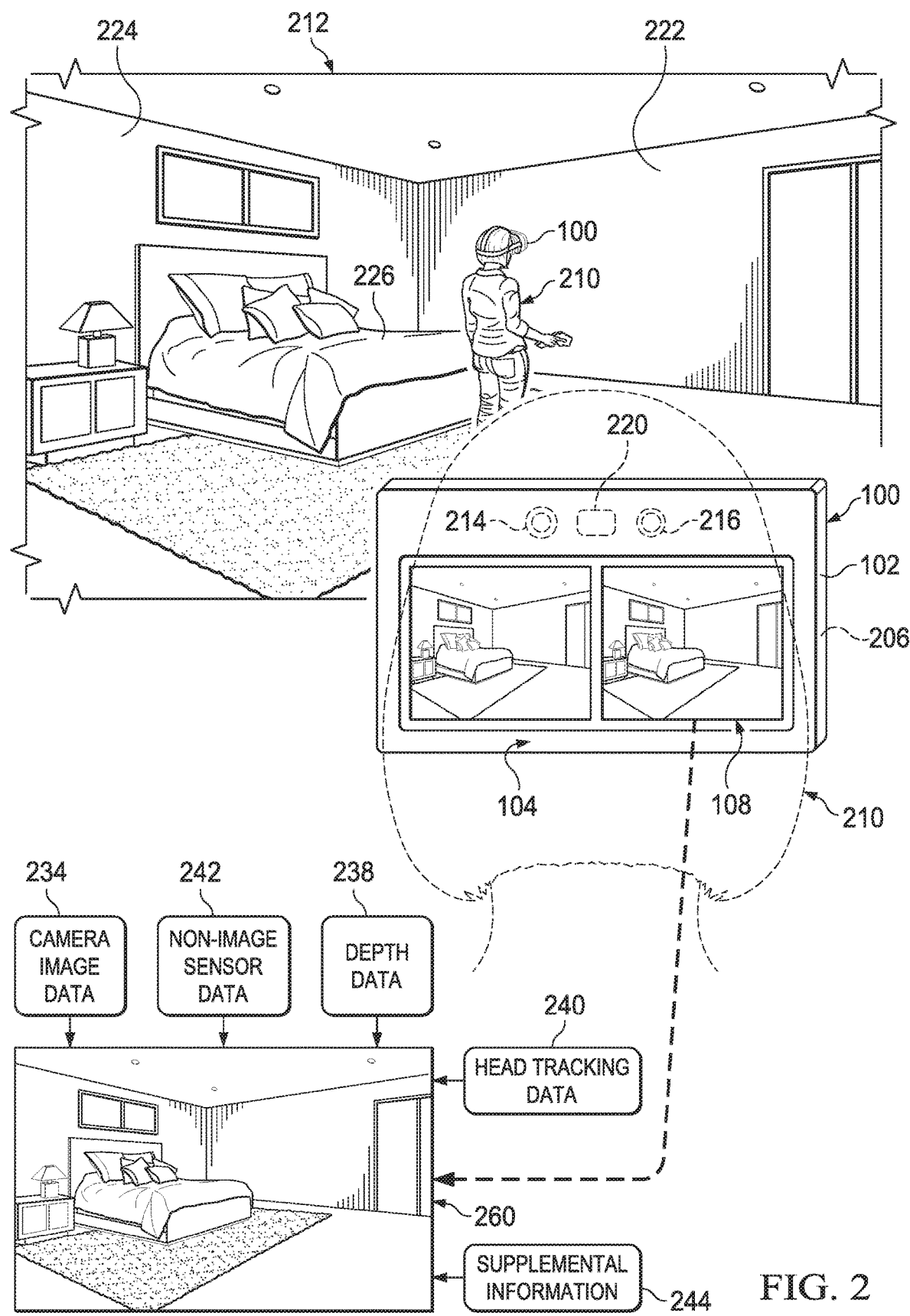
FIG. 2 illustrates a block diagram of a HMD system and environment in accordance with an illustrative embodiment of the disclosure.

FIG. 2 illustrates a detailed view of a HMD system and environment 200. In FIG. 2, HMD 100 includes a housing 102 having a surface 104 opposite another surface 206, as well as a set of straps or a harness (not shown) to mount the housing 102 on the head of a user 210 so that the user faces the surface 104 of the housing 102. In the illustrative thin rectangular block form-factor depicted, the surfaces 104 and 206 are substantially parallel with the housing 102. The housing 102 may be implemented in many other form factors, and the surfaces 104 and 206 may have a non-parallel orientation. For the illustrated HMD system implementation, the HMD 100 includes a display device 108 disposed at the surface 206 for presenting visual information to the user 210.

For ease of reference, the surface 206 is referred to herein as the "forward-facing" surface and the surface 104 is referred to herein as the "user-facing" surface as a reflection of this example orientation of the electronic device 100 relative to the user 210, although the orientation of these surfaces is not limited by these relational designations.

HMD 100 includes a plurality of sensors to obtain information regarding a local environment 212, or "space", of the HMD 100. The HMD 100 obtains visual information (imagery) for the local environment 212 via one or more imaging sensors, such as imaging sensors 214, 216, disposed at the forward-facing surface 206. In one embodiment, the imaging sensor 214 is implemented as a wide-angle imaging sensor having a fish-eye lens or other wide-angle lens to provide a wider angle view of the local environment 212 facing the surface 206, while the imaging sensor 216 is implemented as a narrow-angle imaging sensor having a typical angle of view lens to provide a narrower angle view of the local environment 212 facing the surface 206. Accordingly, the imaging sensor 214 and the imaging sensor 216 are also referred to herein as the "wide-angle imaging sensor 214" and the "narrow-angle imaging sensor 216," respectively. In one embodiment, the HMD 100 may use a wide-angle lens of up to 260 degrees to enable capture of the details of the environment to improve feature tracking. A feature track is generated by identifying one or more image features in a first image frame and then matching those one or more image features with one or more corresponding image features in consecutive frames. By matching image features over successive pairs of image frames, a list of feature tracks may be formed with each feature track containing a sequence of image feature locations across the frames.

One or more of the imaging sensors 214, 216 may serve other imaging functions for the HMD 100 in addition to capturing imagery of the local environment 212. To illustrate, the imaging sensors 214, 216 may be used to support visual telemetry functionality, such as capturing imagery to support position and orientation detection. Further, in some embodiments, an imaging sensor (not shown) disposed at the user-facing surface 104 may be employed for tracking the movements of the head of the user 210 or for facial recognition, and thus providing head tracking information that may be used to adjust a view perspective of imagery presented via the display device 108. The HMD 100 also may rely on non-image information for pose detection. This non-image information can be obtained by the HMD 100 via one or more non-image sensors (not shown in FIG. 1), such as a gyroscope or ambient light sensor. The non-image sensors also can include user interface components, such as a keypad (e.g., touchscreen or keyboard), microphone, mouse, and the like.

In operation, the HMD 100 captures imagery of the local environment 212 via one or both of the imaging sensors 214, 216, modifies or otherwise processes the captured imagery, and provides the processed captured imagery for display on the display device 108. In implementations with two imaging sensors, the imagery from the left side imaging sensor 214 may be processed and displayed in left side region of the display device 108 concurrent with the processing and display of the imagery from the right side imaging sensor 216 in a right side region of the display device 108, thereby enabling a stereoscopic 3D display of the captured imagery.

In addition to capturing imagery of the local environment 212 for display with augmented reality (AR) or virtual reality (VR) modification, in at least one embodiment the HMD 100 uses the image sensor data and the non-image sensor data to determine a relative pose (that is, position and/or orientation) of the HMD 100, that is, a pose relative to the local environment 212. This relative pose information may be used by the HMD 100 in support of simultaneous location and mapping (SLAM) functionality, visual odometry, or other location-based functionality.

The determination of the relative pose may be based on the detection of spatial features in image data captured by one or more of the imaging sensors 214, 216 and the determination of the pose of the HMD 100 relative to the detected spatial features. To illustrate, in the illustrated example of FIG. 2, the local environment 212 includes a bedroom that includes two walls, 222, 224, and a bed 226. The user 210 has positioned and oriented the HMD 100 so that the imaging sensors 214 and 216 capture camera image data 234 that includes these spatial features of the hallway. In this example, the depth sensor 220 also captures depth data 238 that reflects the relative distances of these spatial features relative to the current pose of the HMD 100. Further, a user-facing imaging sensor (not shown) captures image data representing head tracking data 240 for the current pose of the head of the user 210. Non-image sensor data 242, such as readings from a gyroscope, a magnetometer, an ambient light sensor, a keypad, a microphone, and the like, also is collected by the HMD 100 in its current pose.

From this input data, the HMD 100 can determine its relative pose without explicit absolute localization information from an external source. To illustrate, the HMD 100 can perform multiview analysis of the wide angle imaging sensor image data 234 and the narrow angle imaging sensor image data 136 to determine the distances between the HMD 100 and the walls 222, 224 and bed 226. Alternatively, the depth data 238 obtained from the depth sensor 220 can be used to determine the distances of the spatial features. From these distances the HMD 100 can triangulate or otherwise infer its relative position in the office represented by the local environment 212. As another example, the HIVID 100 can identify spatial features present in one set of captured image frames of the image data 234, determine the initial distances to these spatial features, and then track the changes in position and distances of these spatial features in subsequent captured imagery to determine the change in pose of the HMD 100. In this approach, certain non-image sensor data, such as gyroscopic data or accelerometer data, can be used to correlate spatial features observed in one image frame with spatial features observed in a subsequent image frame.

A breakdown in motion tracking for HMD 100 may occur during movement such as adjusting a HMD 100 display, mounting a HMD 100 onto the head of a user, head shaking while the device is on, or other aggressive fast movements while the HMD 100 is mounted on the head. A fault detection system of the HMD 100 detects the motion tracking failure and may reset or reinitialize the system, as described further herein.

Figure 3:
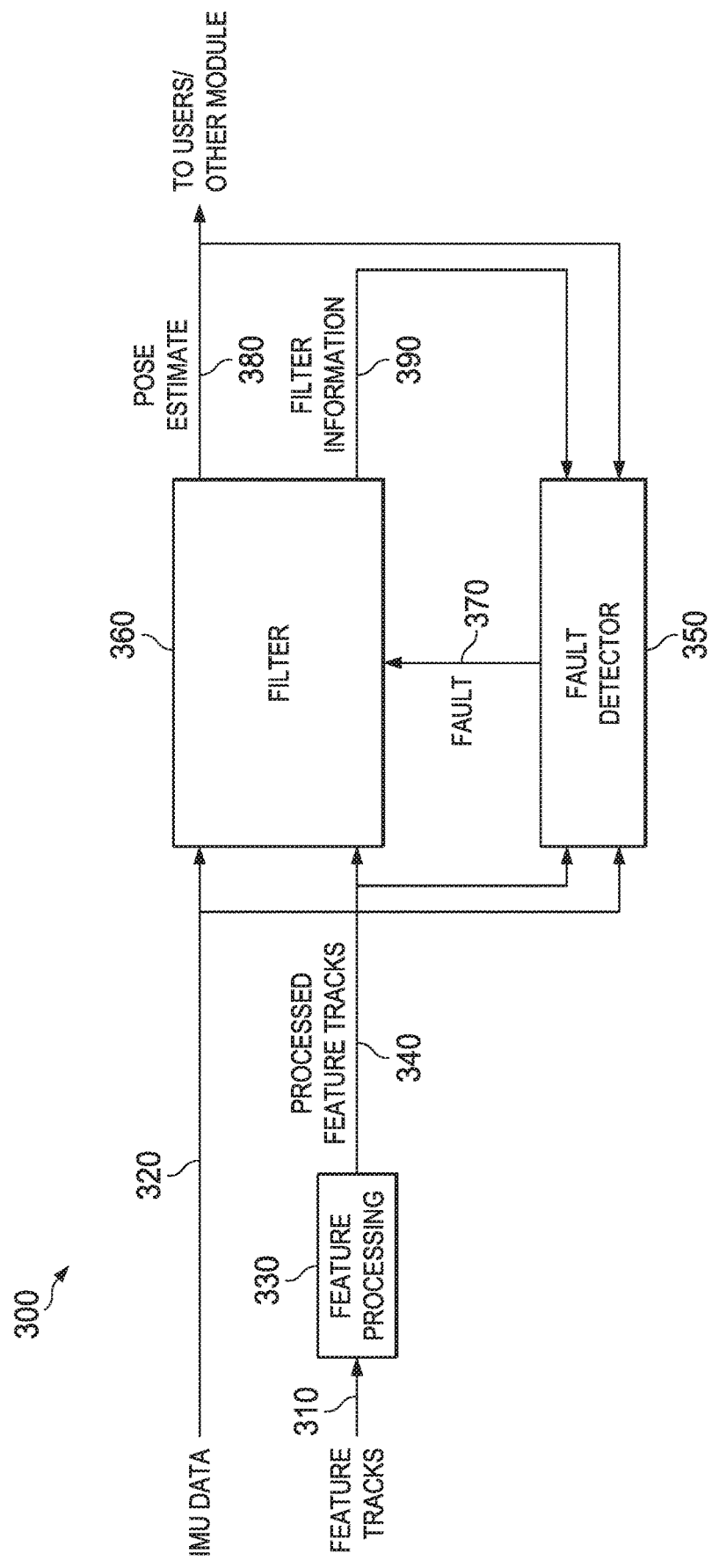
FIG. 3 illustrates an exemplary fault detection system in accordance with an illustrative embodiment of the disclosure.

Turning now to FIG. 3, an exemplary fault detection system 300 of the HMD 100 in accordance with an illustrative embodiment of the disclosure is illustrated. In FIG. 3, filter 360 estimates the relative position of a device or object over time based on input data that provides orientation and direction. In an embodiment, filter 360 is a visual inertial odometry filter. Filter 360 may receive inertial measurement unit (IMU) data 320 from an IMU (not shown) of the HMD 100. The IMU data 320 indicates real world linear acceleration of movement, orientation and gravitational forces based on devices of the IMU such as, without limitation, accelerometers and gyroscopes, and reports that information is provided to the filter 360. Filter 360 also receives processed feature tracks 340 that originate from feature track processing 330 of camera images 310. Filter 360 combines or fuses the IMU data 320 and the processed feature tracks 340 and outputs a position and orientation estimate, pose estimate 380 within 6DoF.

Fault detector 350 inputs pose estimate 380 and filter information 390 that is the fused IMU data 320 and processed feature tracks 340 in addition to the raw IMU data 320 and processed feature tracks 340. The pose provides the orientation and position of a device within a motion tracking framework such as 6DoF or 3DoF relative to a local environment. As the filter 360 estimates motion in a 6DoF sphere, fault detector 350 keeps track of the motion and issues a fault upon determining that an error in the pose estimate is occurring. In response to determining the error, the fault detector 350 sends a fault 370 to filter 360. A fault may occur when the filter 360 is not able to correctly estimate motion. The fault may reset filter 360 to enable a quick reinitialization of the system for continued motion tracking.

Figure 4:
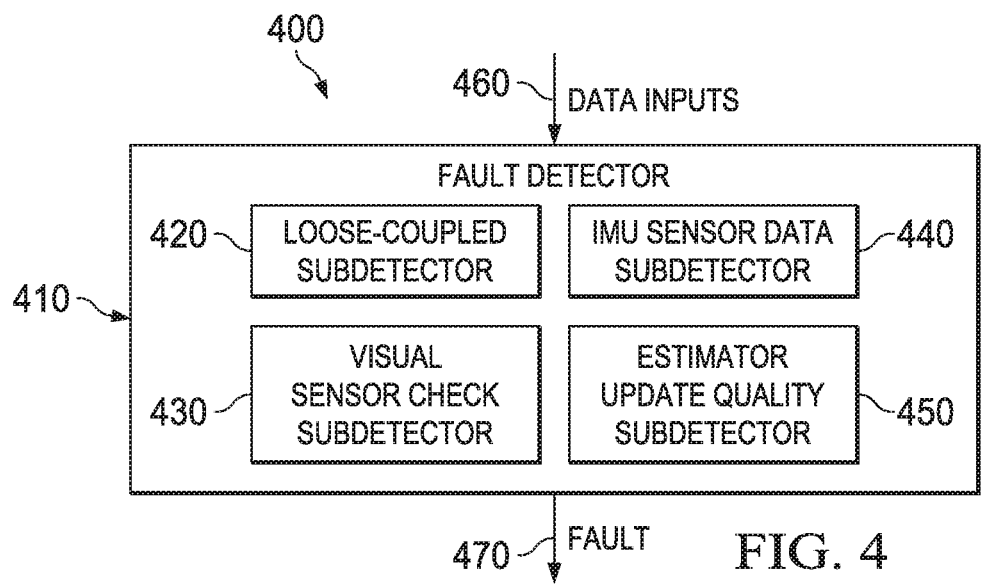
FIG. 4 illustrates a block diagram of a fault detection module in accordance with an illustrative embodiment of the disclosure.

Referring to FIG. 4, a block diagram of fault detection module in accordance with an illustrative embodiment of the disclosure is illustrated. System 400 operates a fault detector 410 that includes a plurality of detectors that may operate in parallel. In one embodiment, fault detector 410 may include four subdetectors, such as, for example, a loose-coupled subdetector 420, visual sensor check subdetector 430, inertial measurement unit (IMU) sensor data subdetector 440 and estimator update quality subdetector 450. Each of the four subdetectors in fault detector 410 accepts data inputs 460 which may include sensory data or filter statistics. One or more of the four subdetectors in fault detector 410 may be individually triggered based on a unique set of conditions in each respective subdetector to signal a failure condition and output a fault 460 signal based on the failure condition.

Turning first to loose-coupled subdetector 420, the subdetector compares the motion detection data from two sources. The first source is filter data which includes real-time motion tracking data such as camera image data and inertial measurement unit (IMU) data. The second source is from an image processing source, such as a random sample consensus or RANSAC algorithm. A RANSAC algorithm may be performed to automatically obtain a direction of translation or motion between two images. The comparison between the results from the RANSAC algorithm and results from the filter seeks to determine whether an angle of consistency exists between the image processing source data and the camera image data. If an angle of consistency is determined not to exist for a threshold period of time (for example, approximately 400 milliseconds), then the loose coupled subdetector 420 issues a fault. Consistency may be determined if the angle of the RANSAC error is within 25 degrees to 35 degrees.

The visual sensor subdetector 430 checks whether or not the feature tracks from camera data that is input to the fault detector 410 are able to provide stable motion tracking good Features are uniquely identifiable images within images. The features create feature tracks when a same feature corresponds in a sequence of images. Image sequences may be detected by external sensors such as cameras. The IMU sensor data subdetector 440 checks two sensors to determine whether or not saturation has occurred. One sensor may be an accelerometer. The other sensor may be a gyroscope. A sensor saturates when output values of the sensors are not within predetermined upper and lower bounds set by the sensor configurations of the filter. If either sensor saturates, IMU sensor subdetector 440 triggers a fault. The estimator update quality subdetector 450 looks at different statistics in the filter to determine whether or not the filter is running properly. If the filter is not running properly, Estimator Update Quality Subdetector 450 issues a fault.

The illustration of fault detector 410 in FIG. 4 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments. For example, IMU sensor data subdetector 440 and Visual Sensor data subdetector 430 may be represented as a single functional block.

Figure 5:
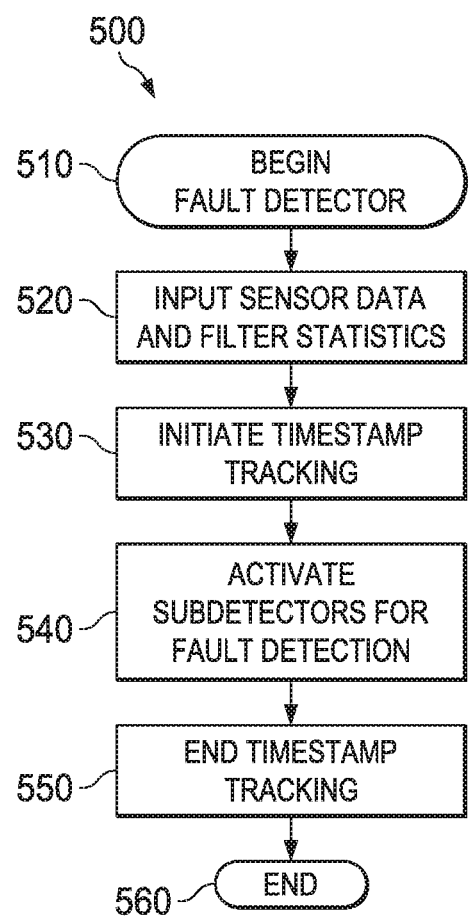
FIG. 5 illustrates a flowchart of a method of fault detection in accordance with an illustrative embodiment of the disclosure.

Turning now to FIG. 5, a flowchart of a method 500 of fault detection in accordance with an illustrative embodiment of the disclosure is illustrated. Fault detection system 300 as illustrated in FIG. 3 begins operation of the fault detector 350 at 510 in FIG. 5. System 300 continually generates sensor data and filter statistics for input to the fault detector 350 at 520. Sensor data may comprise IMU data 320, feature tracks 310 and data from an accelerometer and a gyroscope. At 530, the fault detector 350 starts timestamp checking for each of its subdetectors to keep track of time. The subdetectors of the fault detector are activated at 540. If an error condition exists in any subdetector for a predetermined period of time after the subdetectors are activated at 540, then a fault signal 370 is activated from the fault detector 350. Timestamp checking keeps track of a predetermined period of time that may be initially set by a filter configuration routine. At 550, timestamp checking is ended. At 560, the system 300 ends fault detection.

Figure 6:
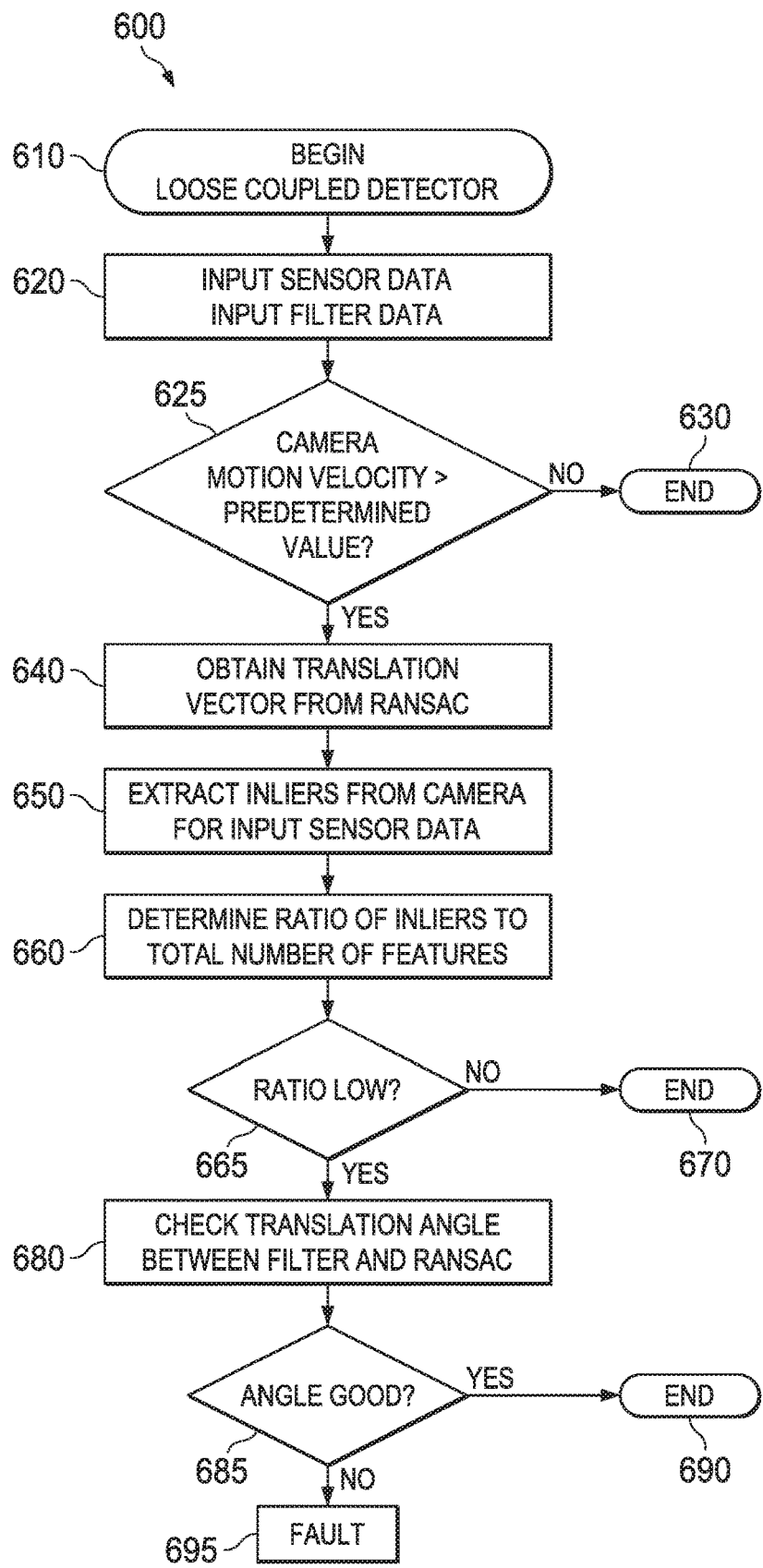
FIG. 6 illustrates a flowchart of a method of operation of the loose-coupled subdetector of FIG. 4 in accordance with an illustrative embodiment of the disclosure.

In FIG. 6, a flowchart 600 of a method of operation of the loose-coupled subdetector in the system of FIG. 4 in accordance with an illustrative embodiment of the disclosure is disclosed. The loose coupled subdetector may be activated by the system at 610. At 620, the loose coupled subdetector inputs system sensor data and filter data. However, operation of the loose coupled subdetector continues based on whether or not motion is detected. Motion may be detected when one or more system cameras are moving to keep track of a feature. At 625, the loose coupled subdetector determines whether the velocity of the camera motion is greater than a predetermined value. The predetermined value may be preset by a filter configuration routine. In an embodiment, the predetermined value may be greater than 0.5 meters per second. The operation of the loose coupled subdetector continues if the velocity condition is satisfied. Otherwise, the operation of the loose coupled subdetector ends at 630. In a continuing operation of the loose coupled subdetector, a translation vector is obtained from the RANSAC algorithm at 640. In some embodiments, RANSAC may be running in the background of processor operations. At 650, the loose coupled subdetector may choose one or more system cameras from which to extract inliers. Inliers are feature tracks that are consistent with RANSAC's estimated camera motion. At 660, the ratio of inliers to the total number of features in the camera images are determined. If it is determined at 665 that the ratio of inliers to the total number of features is not low, the loose coupled subdetector may end processing at 670. If it is determined at 665 that the ratio of inliers to the total number of features is low, then a translation angle between the filter and the results of RANSAC is checked. If the difference in the translation angle between the RANSAC computed vector and the filter computed vector is around 25 degrees or less, then the angle difference is considered to be low or good. If it is determined that the angle is good at 685, then the loose coupled subdetector ends at 690. At 685, if it is determined that the angle is not good, then at 695, the loose coupled subdetector issues a fault.

Figure 7:
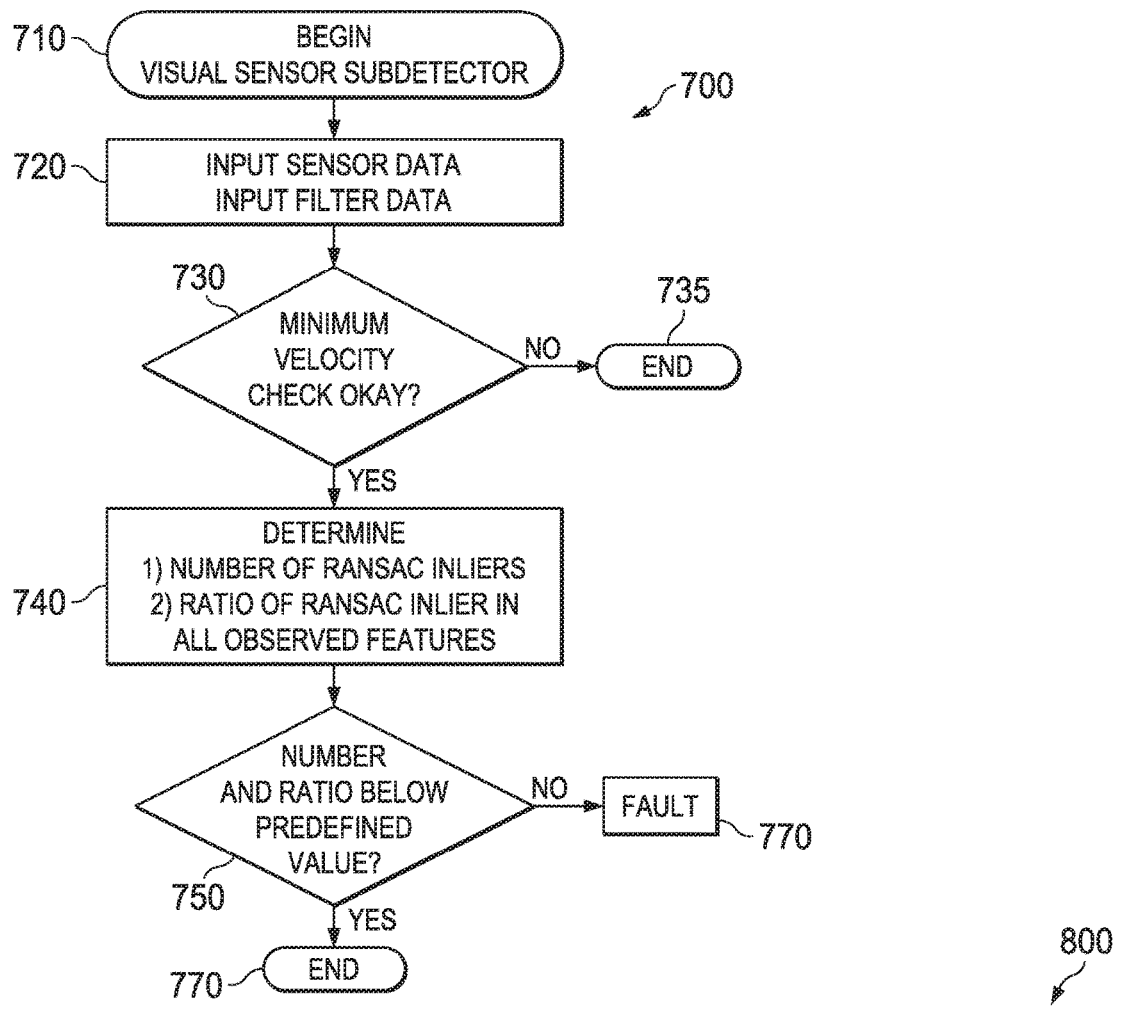
FIG. 7 illustrates a flowchart of a method of operation of the visual sensor check subdetector of FIG. 4 in accordance with an illustrative embodiment of the disclosure.

Turning now to FIG. 7, a flowchart 700 of a method of operation of the visual sensor data subdetector of the system of FIG. 4 in accordance with an illustrative embodiment of the disclosure is illustrated. The visual sensor data subdetector begins at 710 and sensor data and filter data are input at 720. The visual sensor data subdetector conducts a minimum velocity check at 730 to determine whether image sensors, such as cameras, are stationary or moving. If, based on the minimum velocity check at 730, the camera is stationary or is moving at a speed that is less than a predetermined value, the subdetector continues operation at 740. Otherwise the visual sensor data subdetector ends operation at 735. At 740, the Visual Sensor subdetector determines a number of RANSAC inliers and the ratio of RANSAC inliers for all the observed features. A check is done at 750 to determine whether the number and ratio is below predefined values. If the number and ratio are not below predefined values, a fault is issued at 760. If the number and ratio is below predefined values, the visual sensor check subdetector ends at 770.

Figure 8:
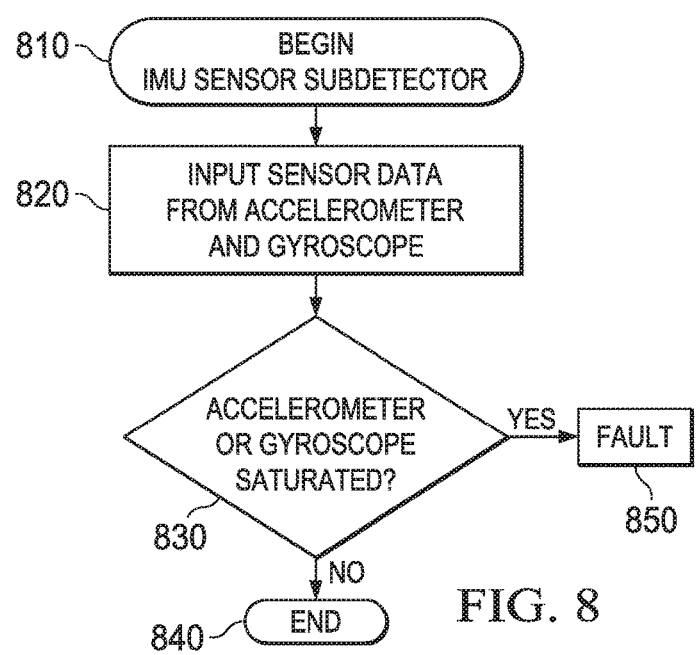
FIG. 8 illustrates a flowchart of the method of the IMU sensor data sub-detector of FIG. 4 in accordance with an illustrative embodiment of the disclosure.

In FIG. 8, a method of the IMU sensor data subdetector in the fault detector of FIG. 4 in accordance with an illustrative embodiment of the disclosure is illustrated. In flowchart 800, the IMU sensor data subdetector 440 begins operation at 810. The IMU sensor data subdetector 440 may contain internal sensors such as an accelerometer sensor and a gyroscope sensor. At 820, the IMU sensor data subdetector 440 inputs data from the accelerometer and the gyroscope of the IMU. The accelerometer and the gyroscope sensors are checked at 830 to determine whether or not one the sensors are saturated. In determining whether or not a sensor may be saturated, the values of the inputs are compared with programmable predetermined values of an upper and lower bound. If the input values do not satisfy the values of the upper and lower bound, the IMU sensor data subdetector 440 issues a fault at 850. The upper and lower bounds may be variable and are predetermined in the system. If the input values satisfy the values of the upper and lower bound, the operation ends at 840.

Figure 9:
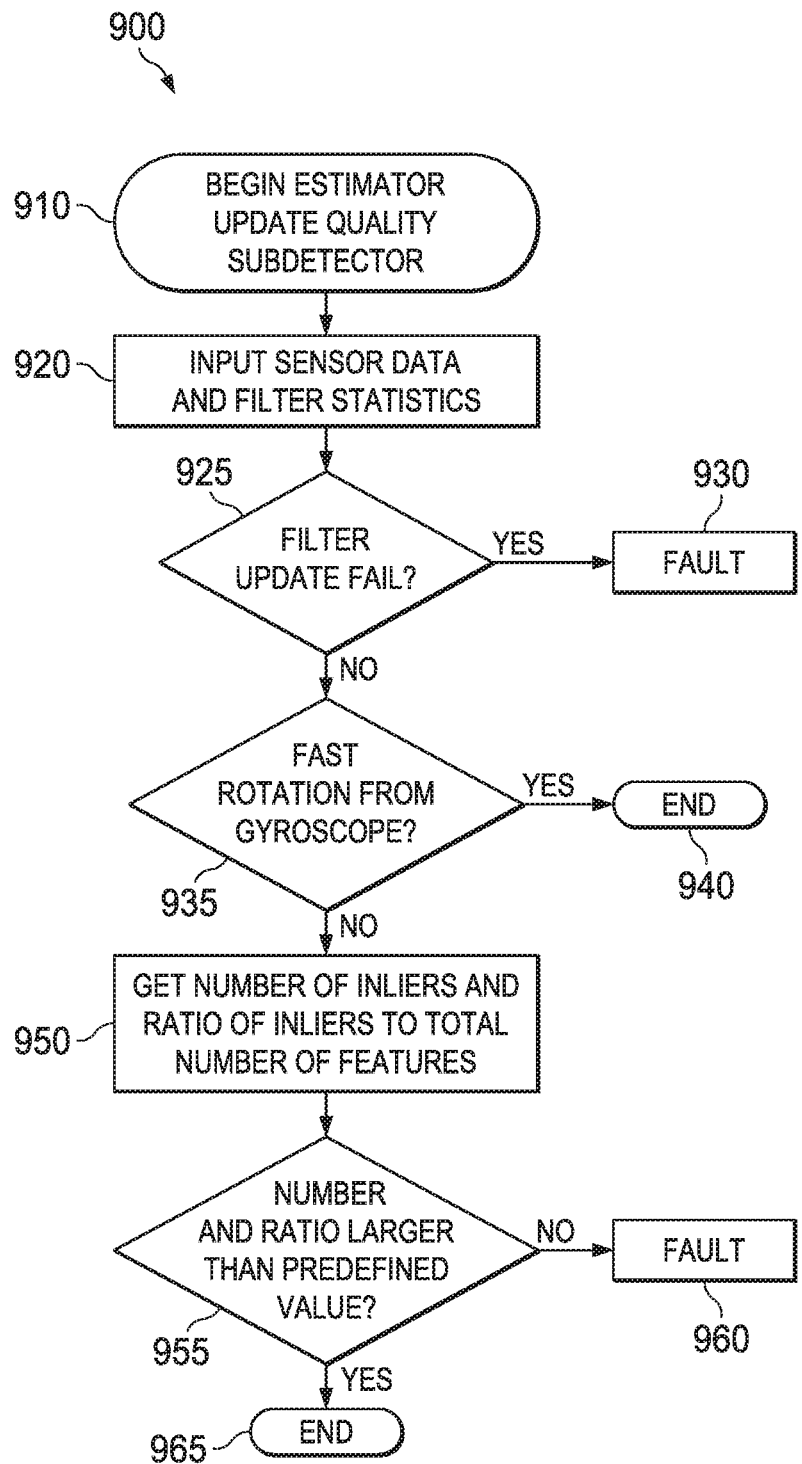
FIG. 9 illustrates a flowchart of the method of the estimator update quality subdetector of FIG. 4 in accordance with an illustrative embodiment of the disclosure.

Turning now to FIG. 9, flowchart 900 illustrates the method of operation of the estimator update quality subdetector in the fault detector of FIG. 4 in accordance with an illustrative embodiment of the disclosure. The estimator update quality subdetector 450 of FIG. 4 reviews filter statistics output from the filter to determine whether the filter is running properly and able to provide stable 6DoF pose estimates.

The method of estimator update quality subdetector 450 begins operation at 910 with the input of sensor data and filter statistics at 920. At 925, the estimator update quality subdetector 450 checks whether a filter update has failed. If a filter update has failed, at 930, the estimator update quality subdetector 450 sends a fault. If the filter update has not failed, at 935 the estimator update quality subdetector 450 checks whether the gyroscope has a fast rotation. If the gyroscope has a fast rotation then the estimator update quality subdetector 450 ends at 940. If the gyroscope does not have a fast rotation, a comparison between the number and ratio of inliers is done at 950. At 955, the estimator update quality subdetector 450 checks whether the number of inliers or the ratio of inliers to the total number of features are larger than a predefined value. If the number of inliers or the ration of inliers to the total number of features is not good, the estimator update quality subdetector 450 sends a fault at 960. If the number of inliers or the ratio of inliers to the total number of features is good, the estimator update quality subdetector 450 ends operation at 965.

Figure 10:
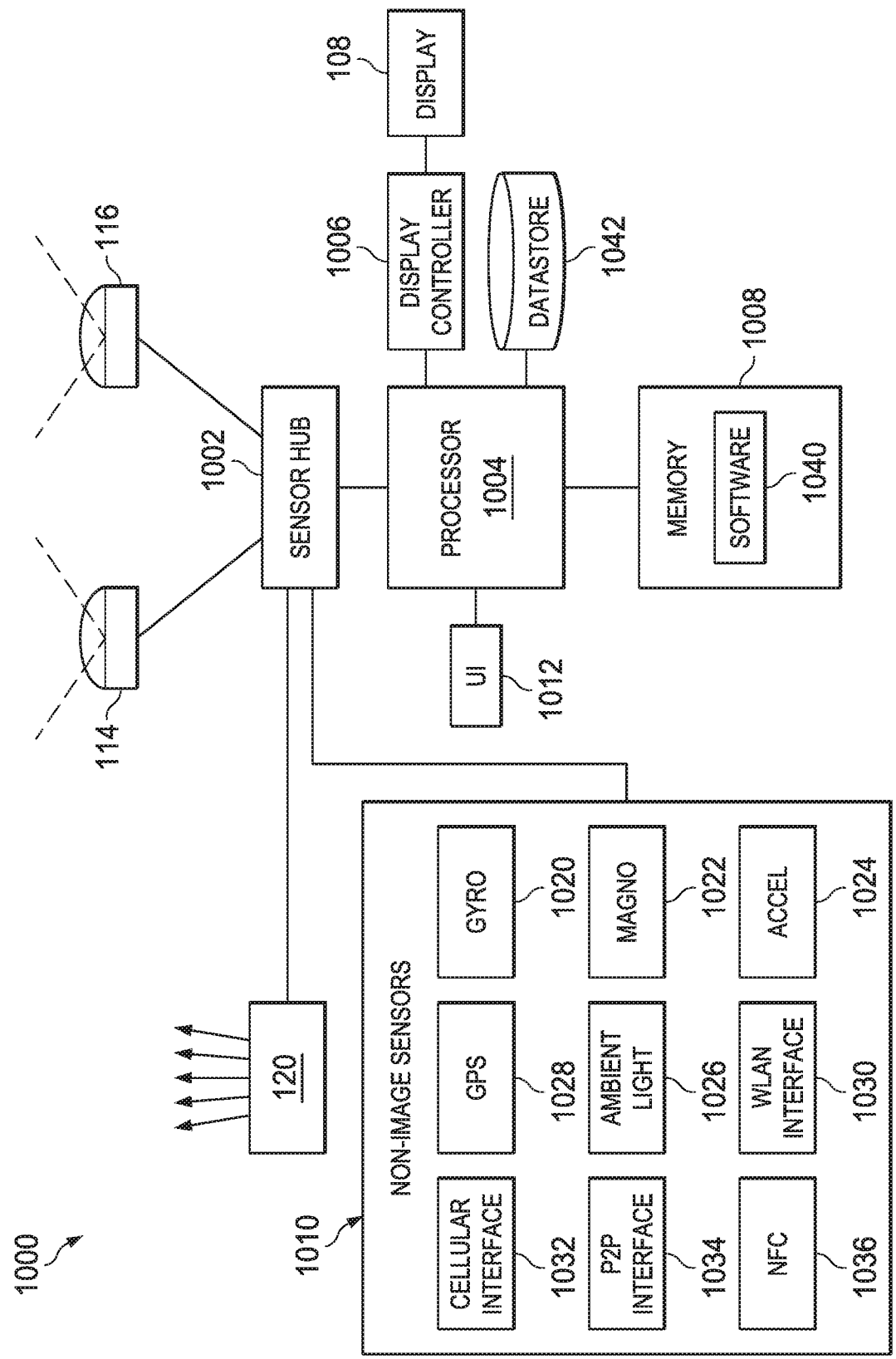
FIG. 10 illustrates a block diagram of a processing system in which a fault detection system may be implemented in accordance with an illustrative embodiment of the disclosure.

FIG. 10 illustrates a block diagram of a processing system in which a fault detection system may be implemented in accordance with an illustrative embodiment of the disclosure. In FIG. 10, processing system 1000 includes the display device 108, the imaging sensors 114, 116, and the depth sensor 120. Processing system 1000 further includes a sensor hub 1002, one or more processors 1004 (e.g., a CPU, GPU, or combination thereof), a display controller 1006, a system memory 1008, a set 1010 of non-image sensors, and a user interface 1012. The user interface 1012 includes one or more components manipulated by a user to provide user input to the HMD 100, such as a touchscreen, a mouse, a keyboard, a microphone, various buttons or switches, and various haptic actuators. The set 1010 of non-image sensors can include any of a variety of sensors used to provide non-image context or state of the HMD 100. Examples of such sensors include a gyroscope 1020, a magnetometer 1022, an accelerometer 1024, and an ambient light sensor 1026. The non-image sensors further can include various wireless reception or transmission based sensors, such as a GPS receiver 1028, a wireless local area network (WLAN) interface 1030, a cellular interface 1032, a peer-to-peer (P2P) wireless interface 1034, and a near field communications (NFC) interface 1036.

HMD 100 of FIG. 1 further has access to various datastores 1042 storing information or metadata used in conjunction with its image processing, location mapping, and location-utilization processes. The datastores 1042 can include a spatial feature datastore to store metadata for 2D or 3D spatial features identified from imagery captured by the imaging sensors of the HMD 100, a SLAM datastore that stores SLAM-based information, such as mapping information for areas of the local environment 112, as illustrated in FIG. 2, already explored by the HMD 100, an AR datastore that stores AR overlay information or VR information, such as CAD-based representations of the relative locations of objects of interest in the local environment 112. The datastores 1042 may be local to the HMD 100, such as on a hard drive, solid state memory, or removable storage medium (not shown), the datastores 1042 may be remotely located at one or more servers and accessible via, for example, one or more of the wireless interfaces of the HMD 100, or the datastores 1042 may be implemented as a combination of local and remote data storage.

In operation, the imaging sensors 114, 116 capture imagery of a local environment, the sensor hub 1002 processes the captured imagery to produce modified imagery, and the display controller 1006 controls the display device 108 to display the modified imagery at the display device 108. Concurrently, the processor 1004 executes one or more software programs 1040 to provide various functionality in combination with the captured imagery, such spatial feature detection processes to detect spatial features in the captured imagery or in depth information captured by the depth sensor 120, the detection of the current pose of the HMD 100 based on the detected spatial features or the non-sensor information provided by the set 1010 of non-image sensors, the generation of AR overlays to be displayed in conjunction with the captured imagery, VR content to be displayed in addition to, or as a representation of the captured imagery, and the like. For example, the fault detector 410 as illustrated in FIG. 4 may be part of the software programs 1040 that are executed by the processor.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

The various embodiments of the present disclosure illustrate the implementation of a fault detection system that enables quick error detection and recovery to enable a more stable motion tracking. The system includes at least four subdetector modules that are running simultaneously. When any one of the four subdetectors in the system detects an error, a fault is triggered in the system. The system may then quickly recover and reinitialize for continued motion tracking.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method of fault detection in motion tracking, comprising:
   receiving sensor data and filter statistics to a fault detector comprising a plurality of subdetectors;
   activating a subdetector of the plurality of subdetectors in response to an image sensor velocity being greater than a threshold velocity;
   identifying a failure at the activated subdetector based on the sensor data and filter statistics; and
   providing a fault signal from the fault detector to a filter and resetting the filter in response to the failure identification.

2. The method of claim 1, further comprising:
   initiating timestamp tracking; and identifying the failure in response to a condition in at least one of the plurality of subdetectors that exists for a predetermined period of time, the predetermined period of time being set by a filter configuration routine.

3. The method of claim 1, wherein the sensor data and filter statistics comprise inertial measurement unit (IMU) data and feature tracks.

4. The method of claim 1, wherein activating the subdetector comprises activating a loose-coupled subdetector in response to the image sensor velocity being greater than the threshold velocity.

5. The method of claim 4, wherein the loose-coupled subdetector identifies a failure in response to an angle of translation of a vector of an image from a filter and an output from RANSAC not being within a threshold limit.

6. The method of claim 1, wherein activating the subdetector comprises activating a visual sensor data subdetector in response to the image sensor velocity being greater than the threshold velocity.

7. The method of claim 6, wherein the visual sensor data subdetector determines a number of RANSAC inliers and a ratio of RANSAC inliers to all observed features.

8. The method of claim 7, wherein the visual sensor data subdetector determines a failure in response to the number and the ratio being below a predetermined threshold.

9. The method of claim 1, wherein activating the subdetector comprises activating an inertial measurement unit (IMU) sensor data subdetector based on the sensor data from an accelerometer and a gyroscope.

10. The method of claim 9, wherein the IMU sensor data subdetector determines a failure in response to signals being measured by the accelerometer and gyroscope being larger that a dynamic range associated with the accelerometer and gyroscope.

11. The method of claim 1, wherein activating the subdetector comprises activating an estimator update quality subdetector to determine whether the filter is performing motion tracking accurately.

12. The method of claim 11, wherein the estimator update quality subdetector identifies a failure in response to determining that a number of inliers to a ratio of inliers to a total number of features is not within a predetermined estimate.

13. A system for performing fault detection in motion tracking, comprising:
a filter;
a fault detector associated with the filter, the fault detector comprising a plurality of subdetectors, wherein at least one of the subdetectors is configured to activate in response to an image sensor velocity being greater than a threshold velocity, configured to:
provide a fault signal to the filter in response to detecting a failure condition at the at least one of the subdetectors; and
reset the filter in response to detecting a failure condition; and
a feature processing block associated with the filter and the fault detector.

14. The system of claim 13, wherein the fault detector comprises at least four subdetectors.

15. The system of claim 14, wherein the at least four subdetectors include a loose-coupled subdetector, an inertial measurement unit (IMU) sensor data subdetector, a visual sensor data subdetector, and an estimator update quality subdetector.

16. The system of claim 14, wherein the fault detector outputs a fault in response to the at least one of the four subdetectors outputting a fault.

17. The system of claim 13, wherein the filter is a visual inertial odometry filter.

18. The system of claim 13, wherein the failure condition is based on sensor data and filter statistics comprising inertial measurement unit (IMU) data and feature tracks.

19. A non-transitory computer readable medium having stored therein instructions, which when executed by a processor, perform a method comprising:
receiving sensor data and filter statistics to a fault detector comprising a plurality of subdetectors;
activating a subdetector of the plurality of subdetectors in response to an image sensor velocity being greater than a threshold velocity;
identifying a failure at the activated subdetector based on the sensor data and filter statistics; and
outputting a fault signal from the fault detector to a filter and resetting the filter in response to the failure identification.

20. The non-transitory computer readable medium of claim 19, the method further comprising:
initiating timestamp tracking; and
identifying the failure in response to a condition in at least one of the plurality of subdetectors that exists for a predetermined period of time, the predetermined period of time being set by a filter configuration routine.

* * * * *